(12) United States Patent
Li et al.

(10) Patent No.: US 10,232,441 B2
(45) Date of Patent: Mar. 19, 2019

(54) FABRICATION OF ARTICLES FROM NANOWIRES

(71) Applicant: United Technologies Corporation, Hartford, CT (US)

(72) Inventors: Weina Li, South Glastonbury, CT (US); Michael J. Birnkrant, Kenilworth, NJ (US); Paul Sheedy, Bolton, CT (US); James T. Beals, West Hartford, CT (US); Rhonda R. Willigan, Manchester, CT (US); Jose L. Santana, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 358 days.

(21) Appl. No.: 14/641,653

(22) Filed: Mar. 9, 2015

(65) Prior Publication Data
US 2016/0175933 A1    Jun. 23, 2016

Related U.S. Application Data

(60) Provisional application No. 61/954,660, filed on Mar. 18, 2014.

(51) Int. Cl.
*B22F 3/11* (2006.01)
*B22F 3/00* (2006.01)
(Continued)

(52) U.S. Cl.
CPC .............. *B22F 3/11* (2013.01); *B22F 3/002* (2013.01); *B22F 5/009* (2013.01); *B22F 5/04* (2013.01);
(Continued)

(58) Field of Classification Search
CPC ........... B22F 1/0025; B22F 3/002; B22F 3/11
See application file for complete search history.

(56) References Cited

U.S. PATENT DOCUMENTS 5,102,745 A * 4/1992 Tatarchuk ............... B22F 3/002
428/605
5,592,686 A    1/1997 Third et al.
(Continued)

FOREIGN PATENT DOCUMENTS

CN    102092135    * 6/2011
WO    9014224    11/1990
(Continued)

OTHER PUBLICATIONS

Krishnadas, K. "Pristine and hybrid nickel nanowires." 2011. J. Phys. Chem. 115. p. 4483-4490.*
(Continued)

*Primary Examiner* — Colleen P Dunn
*Assistant Examiner* — Nicholas A Wang
(74) *Attorney, Agent, or Firm* — Carlson, Gaskey & Olds, P.C.

(57) ABSTRACT

A method of fabricating an article includes providing an arrangement of loose nanowires, forming the loose nanowires into a gas turbine engine airfoil by depositing the loose nanowires into a mold that has a geometry of the gas turbine engine airfoil, and bonding the loose nanowires together into a unitary cellular structure that has the geometry of the gas turbine engine airfoil.

13 Claims, 2 Drawing Sheets

(51) Int. Cl.
*B22F 5/00* (2006.01)
*B22F 5/04* (2006.01)
*C04B 35/622* (2006.01)
*C04B 38/00* (2006.01)
*B22F 1/00* (2006.01)

(52) U.S. Cl.
CPC .. *C04B 35/62231* (2013.01); *C04B 35/62236* (2013.01); *C04B 35/62272* (2013.01); *C04B 35/62281* (2013.01); *C04B 38/0041* (2013.01); *C04B 38/0058* (2013.01); *B22F 1/0025* (2013.01); *C04B 2235/428* (2013.01); *C04B 2235/522* (2013.01); *C04B 2235/5252* (2013.01)

(56) References Cited

U.S. PATENT DOCUMENTS

| | | | |
|---|---|---|---|
| 5,848,351 | A | 12/1998 | Hoshino et al. |
| 6,719,947 | B1 | 4/2004 | Jha et al. |
| 6,818,081 | B2 | 11/2004 | Gash et al. |
| 6,986,818 | B2 | 1/2006 | Tillotson et al. |
| 6,986,819 | B2 | 1/2006 | Tillotson et al. |
| 7,211,320 | B1* | 5/2007 | Cooper ............. A61L 2/0082 210/263 |
| 7,803,707 | B2* | 9/2010 | Jin ................. H01L 21/2855 257/E21.478 |
| 8,172,964 | B2 | 5/2012 | Gash et al. |
| 8,226,861 | B2 | 7/2012 | Hayes et al. |
| 8,272,843 | B1* | 9/2012 | Ryznic ............... F01D 5/282 416/241 A |
| 8,303,883 | B2 | 11/2012 | Landingham et al. |
| 2006/0042417 | A1 | 3/2006 | Gash et al. |
| 2007/0142643 | A1 | 6/2007 | Huynh et al. |
| 2008/0020499 | A1* | 1/2008 | Kim ................... B82Y 10/00 438/20 |
| 2010/0190639 | A1 | 7/2010 | Worsley et al. |
| 2012/0132930 | A1* | 5/2012 | Young ............... H01L 31/0481 257/84 |
| 2012/0235073 | A1 | 9/2012 | Seo et al. |
| 2012/0298170 | A1 | 11/2012 | Lee et al. |
| 2013/0021718 | A1 | 1/2013 | Yager et al. |

FOREIGN PATENT DOCUMENTS

| | | | |
|---|---|---|---|
| WO | WO2005005687 | * | 1/2005 |
| WO | 2006118186 | | 11/2006 |
| WO | 2010041014 | | 10/2008 |
| WO | 2012060776 | | 5/2012 |
| WO | WO2012060776 | * | 5/2012 |

OTHER PUBLICATIONS

Yang et al. "Atomistic simulation for the size effect on the mechanical properties of Ni/Ni3Al nanowire." 2013. Journal of Applied Physics. 114. p. 1-7 (Year: 2013).*

Luther, E. et al. (2009). Nanostructured metal foams: Synthesis and applications. PowderMet2009, Las Vegas, NV.

Krishnadas, K.R., Sajanlal, P.R., Pradeep, T. (2011). Pristine and hybrid nickel nanowires: Template-, magnetic field-, and surfactant-free wet chemical synthesis and Raman studies. The Journal of Physical Chemistry. ACS Publications, Feb. 25, 2011.

Yuan, J., Laubernds, K., Villegas, J., Gomez, S., Suib, S. (2004). Spontaneous formation of inorganic paper-like materials. Advanced Communications, Wiley-VCH Verlag, Oct. 4, 2004.

* cited by examiner

FABRICATION OF ARTICLES FROM NANOWIRES

CROSS-REFERENCE TO RELATED APPLICATION

This application claims priority to U.S. Provisional Application No. 61/954,660, filed Mar. 18, 2014.

BACKGROUND

This disclosure relates to fabrication of nanocellular articles.

Inorganic materials structured on the nanoscale often have enhanced chemical and physical properties that can find application in a number of fields. Nanocellular materials, such as porous metal foams, can be used in filters, electrodes, catalysts, refractory articles or other applications.

There are a number of methods for fabricating nanocellular materials. For example, metallic nanocellular materials can be fabricated using combustion synthesis, metal dealloying or sol-gel processing with supercritical drying. While chemical synthesis such as the sol-gel method may be useful, these techniques can be relatively complex and involve processing of numerous chemical intermediates, including but not limited to oxides that require thermochemical reduction of the oxide to the desired metal.

SUMMARY

A method of fabricating an article according to an example of the present disclosure includes providing an arrangement of loose nanowires and bonding the nanowires together into a unitary cellular structure.

A further embodiment of any of the foregoing embodiments includes, prior to the bonding, forming the loose nanowires into a geometry of an end-use article.

In a further embodiment of any of the foregoing embodiments, the forming of the loose nanowires into the geometry of the end-use article includes depositing successive layers of the nanowires.

In a further embodiment of any of the foregoing embodiments, the forming of the loose nanowires into the geometry includes depositing the loose nanowires into a mold.

In a further embodiment of any of the foregoing embodiments, at least a portion of the nanowires are nickel or a nickel alloy.

In a further embodiment of any of the foregoing embodiments, the arrangement of loose nanowires includes nanowires of differing compositions.

In a further embodiment of any of the foregoing embodiments, at least a portion of the nanowires are a substantially pure metal.

In a further embodiment of any of the foregoing embodiments, at least a portion of the nanowires are a ceramic material.

In a further embodiment of any of the foregoing embodiments, the bonding includes thermal sintering or diffusion.

In a further embodiment of any of the foregoing embodiments, the providing of the arrangement of loose nanowires includes forming metallic nanowires by wet chemical synthesis and then drying the metallic nanowires, to directly produce the metallic nanowires without reduction of an oxide of the metal of the metallic nanowires.

In a further embodiment of any of the foregoing embodiments, the unitary cellular structure includes open cells, with a majority of the open cells having a maximum size of less than ten micrometers.

A further embodiment of any of the foregoing embodiments includes, before the bonding, consolidating the nanowires under pressure to alter pore size and shape.

A further embodiment of any of the foregoing embodiments includes conducting the bonding in an environment having a gas that reacts with the nanowires to alter the composition of the nanowires.

A method of fabricating an article according to an example of the present disclosure includes providing a dispersion of nanowires in a first carrier fluid, combining the dispersion with a solution including at least one alloy element in a second carrier fluid, removing the first carrier fluid and the second carrier fluid to provide an arrangement of dry, loose nanowires including the at least one alloy element, and bonding the dry, loose nanowires together into a unitary cellular structure.

In a further embodiment of any of the foregoing embodiments, at least a portion of the nanowires are metallic.

In a further embodiment of any of the foregoing embodiments, at least a portion of the nanowires are a substantially pure metal.

In a further embodiment of any of the foregoing embodiments, the at least one alloy element is selected from the group consisting of chromium, cobalt, molybdenum, tungsten, rhenium, tantalum, hafnium, yttrium, carbon, boron, zirconium, and combinations thereof.

In a further embodiment of any of the foregoing embodiments, the at least one alloy element is selected from the group consisting of cobalt, chromium, hafnium, yttrium, and combinations thereof.

In a further embodiment of any of the foregoing embodiments, the bonding includes thermal sintering.

A further embodiment of any of the foregoing embodiments includes, prior to the bonding, forming the dry, loose nanowires into a geometry of an end-use article.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
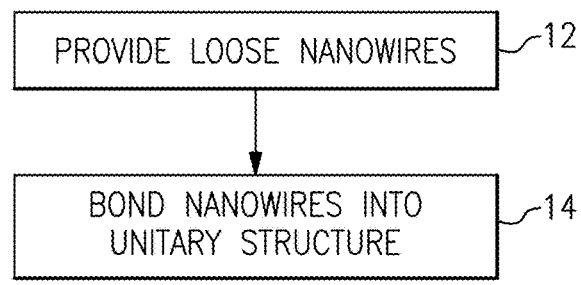
FIG. 1 shows an example method of fabricating an article using nanowires.

Disclosed herein are examples of a method for fabricating an article using nanowires. The article can be a gas turbine engine article, but the present disclosure is not limited in application to turbine engine articles and will also find applicability in filters, electrodes, catalysts, refractory articles, and many other end uses. For example, the article can be an article that is used in a relatively severe environment, such as environments requiring high temperature resistance, high corrosion resistance, or high strength, or environments where superalloy, intermetallic, or ceramic materials are used. In a gas turbine engine, the example article can be a component in a propulsion fan, a compressor, a combustor, or a turbine but is not limited to such engine articles.

Due to its submicron ligament dimensions, a nanocellular material may have a substantially increased strength-to-weight ratio compared with metal foams that have ligament diameters greater than one micron. In addition, the mechanical properties (strength-to-weight ratio, elastic modulus, etc.) of the metal foam may be correlated with the diameter (d) of the ligaments. In general, the specific mechanical strength properties of the metal foam may increase as the diameter (d) of the ligaments decrease. A desired submicron diameter (d) of the ligaments may be selected in order to control specific mechanical properties of the metal foam, such as, but not limited to, elastic modulus, thermo-mechanical fatigue and strength-to-weight ratio. Once the desired ligament diameter is selected, the metal foam may be prepared under reaction conditions that provide the desired ligament diameters. In accordance, nanocellular materials may be useful in many different applications. Furthermore, nano-materials that are compatible with netshape production, near-netshape fabrication and additive manufacturing may also be useful. It may also be useful to solution process nanocellular materials and use bulk and scalable processes to fabricate articles.

Nanocellular material fabrication techniques are limited in the size and geometry of the articles that can be formed. For example, the sol-gel technique includes the conversion of a sol that has precursor materials to a gel that contains dispersed metal-containing compounds. The precursors form oxides of the metal of interest and the gel is then dried using a supercritical drying technique, leaving a ligand network of metal oxide. The oxide is then thermochemically reduced in a reducing atmosphere or agent to produce a metal nanocellular material. The supercritical drying and thermochemical reduction processes subject the material to a substantial amount of stress. The oxide network is relatively rigid and fragile, and is therefore susceptible to fracture. The fracturing can become more pronounced at larger scale and thus prevent the process from being scaled-up to produce suitable end-use articles.

As will be described, the present disclosure avoids supercritical drying and also mitigates the effects of stress, thereby avoiding scale-up limits and enabling the fabrication of larger end-use articles.

FIG. 1 illustrates a method 10 of fabricating an article using nanowires. Although the method 10 may be used to fabricate end-use articles of cellular materials, such as micro- and nano-cellular materials. The method 10 includes step 12 of providing an arrangement of loose nanowires. For example, the nanowires can be synthesized from a variety of elements to make single element nanowire. A nanowire may also be composed of two or more elements. The synthesized nanowires can be mixed or used as prepared with other nanomaterials.

The nanowires are then arranged into the shape of an article using a deposition technique or mold. At step 14, the nanowires are then bonded into a unitary structure. For example, the nanowires can be sintered together using a suitable technique to form an article.

Figure 2A:
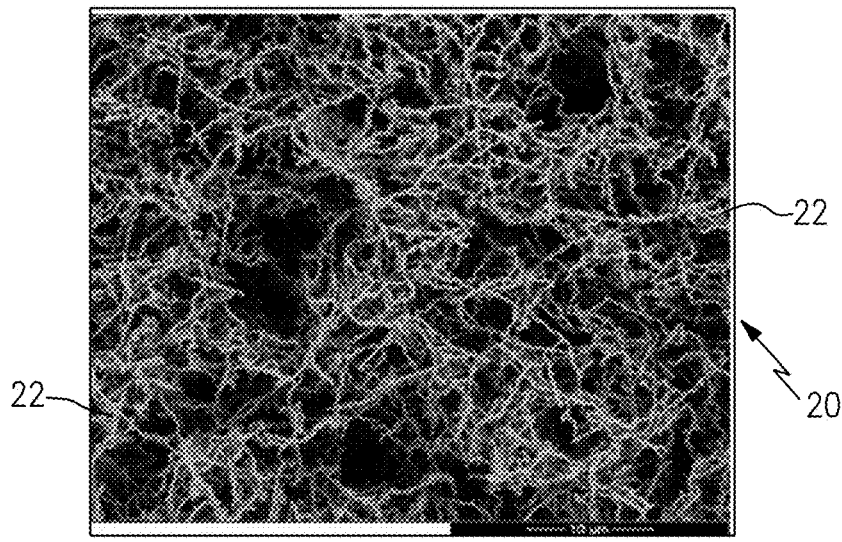
FIG. 2A shows a micrograph of an arrangement of loose nanowires.

The loose nanowires serve as the fundamental "building blocks" for fabricating an article. FIG. 2A illustrates an arrangement 20 of loose nanowires 22. In this example, the nanowires 22 are dry and substantially free of any solvent/carrier fluid. The nanowires 22 have a nanoscale maximum cross-sectional size, perpendicular to the elongated direction. For example, the maximum cross-sectional size can be 1 micrometer or less, 500 nanometers of less, or 250 nanometers or less.

In one further example, nickel nanowires of 120 nanometers in diameter and greater than 5 micrometers in length were synthesized according to known techniques. The nickel nanowires were polycrystalline with a grain size of approximately 22 nanometers and had a face centered cubic crystal lattice. The nickel nanowires can be used as the starting material for building an article.

The nanowires 22 are then assembled into the geometry of an article using a mold or deposition technique. The assembling of the nanowires 22 into the desired geometry can be part of step 12 of the method 10, wherein the nanowires 22 can be provided in step 12 in the desired geometry. In one example a mold of the desired article shape is filled with nanowires 22. The nanowires 22 are then compressed to consolidate the nanowires 22. The pressure used to consolidate the nanowires impacts the final pore size and shape. The relationship between pressure applied and pore size are inverse such that higher pressures result in smaller pore sizes. The consolidated nanowires 22 in the shape of the article can then be transferred to step 14 for bonding. Another example of constructing an article can include depositing the nanowires 22 on a substrate. Successive deposition of nanowire layers can be built up to form an article, or a portion thereof.

The nanowires 22 assembled into the geometry of an article using a mold can be part of step 12 of the method 10, wherein the mold can be provided in step 12 in the desired geometry. The mold in one example was porous or "honeycombed" to allow the gasses in the furnace to flow through the mold and infiltrate the component. The gasses can be chosen to perform a number of different chemical reactions with the nanowires that control the sintering process, as well as provide elemental additions to the final product. The control of the sintering process can be in the form of either facilitating or hindering the sintering.

Although the nanowires 22 are loose, they are entangled. The friction between the nanowires 22 and/or electrostatic attraction between the nanowires 22 can lightly and non-permanently hold the nanowires 22 together in a particular arrangement. In an alternative, binding agents can be used to hold the nanowires 22 together in a particular arrangement in a green state to permit handling and processing as well other elemental additions. In one particular example, the binding agent also provided elemental carbon to the alloy. At this stage however, the nanowires 22 are not permanently bonded together.

Figure 3:
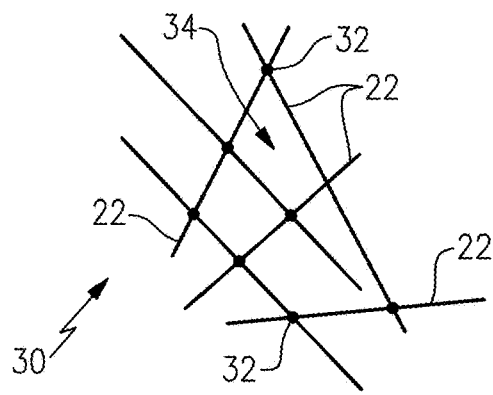
FIG. 3 schematically illustrates a representative portion of a unitary nanocellular structure that has nanowires that are bonded together at bonded nodes.
Figure 2B:
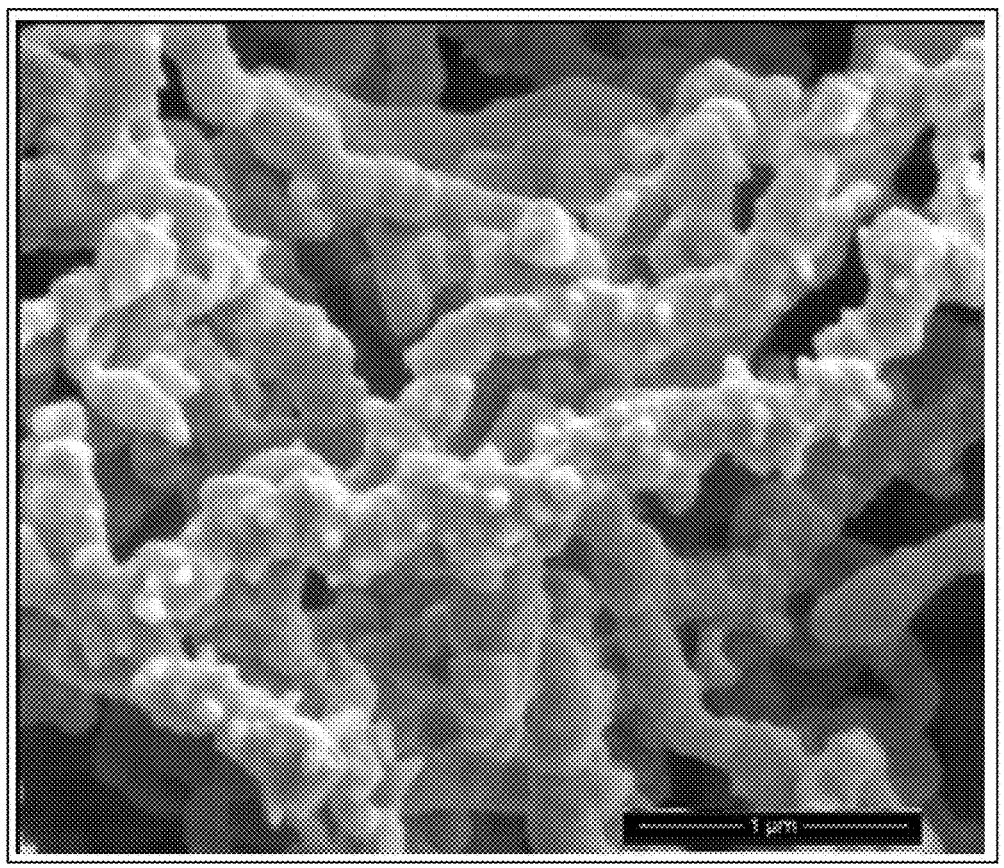
FIG. 2B shows a micrograph of the nanowires after sintering to form an article.

The loose arrangement 20 of nanowires 22 is then bonded together into a unitary structure. FIG. 2B shows a micrograph of sintered nanowires, and FIG. 3 illustrates a representative portion 30 of an example unitary structure made according to the example method. In this example, the nanowires 22 were subjected to a thermal sintering process to bond the nanowires 22 together. During the thermal sintering, the surfaces of the nanowires 22 that are in contact with each other permanently bond together at nodes 32. For example, for metallic nanowires, the nanowires metallurgically bond together at the nodes 32. The mechanism of bonding can differ depending, at least in part, on the selected composition of the nanowires 22, and may be a combination of different mechanisms. Such mechanisms may include, but are not limited to diffusion, solid-state mass transport, and melt flow. The sintering temperature may therefore depend, at least in part, on the composition selected for the nanowires 22. In one example, the sintering temperature is high enough to cause diffusion and/or solid state mass transport, but is below the melting temperature of the composition. In another example, the sintering temperature may be above the melting temperature of a portion of the nanowire or a group of nanowires in the article, but the exposure time is controlled such that the surfaces of the nanowires 22 melt and bond while the cores of the nanowires 22 remain solid and support the structure during sintering. In one further example, the nanowires 22 are placed in two ceramic holders and treated at an elevated temperature in a hydrogen environment. The temperature can be 500° C., 600° C., or 700° C., but will vary depending at least in part on the composition of the nanowires 22.

The nanowires 22 can be metallic, ceramic, or combinations thereof. In one example, the nanowires 22 are nickel, copper, iron, molybdenum, yttrium, manganese, aluminum, chromium or cobalt, or alloys thereof. In further examples, the metal of the nanowires 22 is substantially pure. Table 1 below includes further examples of starting materials and reactions for fabricating nanowires.

TABLE 1

Starting materials and reactions for fabricating nanowires
Electrode Potentials of Metals

| Acidic condition | | Alkaline condition | | |
|---|---|---|---|---|
| Half-cell reaction | $E_a^0$, V | Half-cell reaction | $E_b^0$, V | Synthesis routes |
| $Y^{3+} + 3e^- \rightarrow Y$ | −2.372 | $Y(OH)_3 + 3e^- \rightarrow Y + 3OH^-$ | −2.81 | wet chemistry + oxide reduction |
| $Mg^{2+} + 2e^- \rightarrow Mg$ | −2.363 | $Mg(OH)_2 + 2e^- \rightarrow Mg + 2OH^-$ | −2.69 | wet chemistry; electrochemical method |
| $Hf^{4+} + 4e^- \rightarrow Hf$ | −1.7 | $HfO(OH)_2 + 2H_2O\ 2e^- \rightarrow Hf + 4OH^-$ | −2.5 | wet chemistry + oxide reduction |
| $Al^{3+} + 3e^- \rightarrow Al$ | −1.662 | $Al(OH)_3 + 3e^- \rightarrow Al + 3OH^-$ | −2.31 | wet chemistry, electrochemical method |
| $ZrO_2 + 4H^+ + 4e^- \rightarrow Zr$ | −1.529 | $ZrO(OH)_2 + H_2O + 3e^- \rightarrow Zr + 4OH^-$ | −2.36 | wet chemistry + oxide reduction |
| $Ta_2O_5 + 10H^+ + 10e^- \rightarrow 2Ta + 5H_2O$ | −0.75 | | | wet chemistry + oxide reduction |
| $Cr^{3+} + 3e^- \rightarrow Cr$ | −0.744 | $Cr(OH)_3 + 3e^- \rightarrow Cr + 3OH^-$ | −1.34 | wet chemistry, electrochemical method; reduction |
| $Co^{2+} + 2e^- \rightarrow Co$ | −0.277 | $Co(OH)_2 + 2e^- \rightarrow Co + 2OH^-$ | −0.73 | wet chemistry; reduction |
| $Ni^{2+} + 2e^- \rightarrow Ni$ | −0.25 | $Ni(OH)_2 + 2e^- \rightarrow Ni + 2OH^-$ | −0.72 | wet chemistry; reduction |
| $N_2 + 5H^+ + 2e^- \rightarrow N_2H_5^+$ | −0.23 | $N_2 + 4H_2O + 4e^- \rightarrow N_2H_4 + 4OH^-$ | −1.16 | Hydrazine reduction |
| $Mo^{3+} + 3e^- \rightarrow Mo$ | −0.2 | $MoO_4^{2-} + 4H_2O + 6e^- \rightarrow Mo + 8OH^-$ | −1.05 | wet chemistry; reduction |
| $WO_3(c) + 6H^+ + 6e^- \rightarrow W + 3H_2O$ | −0.09 | $WO_4^{2-} + 4H_2O + 6e^- \rightarrow W + 8OH^-$ | −1.05 | wet chemistry; reduction |
| $ReO_2 + 4H^+ + 4e^- \rightarrow Re + 2H_2O$ | 0.2513 | $ReO_2 + 2H_2O + 4e^- \rightarrow Re + 4OH^-$ | −0.577 | wet chemistry; reduction |

Nickel and its alloys have high temperature resistance, strength, and corrosion resistance and is therefore useful for articles that will be used in severe conditions, such as gas turbine engine articles. In another example, the nanowires 22 are ceramic material. For instance, the ceramic material is selected from oxides, nitrides, carbides, borides, silicides, ternary ceramics (MAX phase materials), and combinations thereof. In further examples, the ceramic material can include at least one of manganese oxide ($MnO_2$), zinc oxide (ZnO), silicon carbide or alumina ($Al_2O_3$).

In another example, the nanowires 22 are a mixture of at least two distinct elemental nanowires, a mixture of ceramic nanowires or a mixture of metal and ceramic nanowires. The mixture of nanowires provides property enhancement by alloying additions in key locations among many other reasons. These and other ceramic nanowires can be fabricated according to known techniques. In an example of a mixture of elemental nanowires could include nickel and copper. An example of a metal and ceramic mixture could be manganese oxide and nickel nanowires were mixed and sintered together to form a nanocellular material.

Intermetallic materials represent an additional class of high temperature materials. In an example route to making intermatallic nanocellular articles, a mixture of nanowires composed of metals and/or ceramics was first prepared. The pre-intermetallic nanowire article was formed of nanowires, followed by heat treatment to produce an intermetallic nanocellular article, which may be composed of silicides or aluminides. In an example of forming an intermetallic nanocellular article, molybdenum oxide nanowires and silicon nanomaterials were mixed together, consolidated and placed in a mold. Subsequent heat treatment resulted in a nanocellular molybdenum silicide ($MoSi_2$). In yet a further example, a nanowire composed of nickel and aluminum can be used to fabricate a nickel aluminide ($Ni_3Al$).

Once bonded together, there are open cells 34 in between the nanowires 22. The open cells 34 serve to reduce density in comparison to a solid of the same composition, and thus can reduce the weight of an end-use article. For example, the end material after bonding can be a nanocellular material with at least a majority of the cells 34 having a size of less than one micrometer in maximum dimension. In further examples, the maximum size of the cells 34 is 500 nanometers or less, or 250 nanometers or less. The maximum size can be selected in accordance with the desired properties of the end-use article with regard to strength, temperature resistance, creep resistance, fatigue resistance, or other design property. Although nanocellular material can provide good properties, as discussed above, in other alternatives the open pores 34 may be micro- or macro-sized.

In one example based on nickel, the arrangement 20 of nanowires 22 is formed by wet chemical synthesis to directly produce the nanowires 22 without the use of an intermediate step of thermochemically reducing an oxide of the nickel, as in the sol-gel technique. The wet chemical synthesis uses an aqueous nickel salt solution, such as nickel chloride. The concentration of nickel in the solution can be varied, but in one example the solution is a one molar solution of nickel in deionized water. Ethylene glycol is added to the solution as a solvent and stirred. Hydrazine is then added as a reducing agent to precipitate nickel. The nickel precipitates in the shape of the nanowires 22, which is an elongated, approximately uniform diameter filament shape. The nanowires 22 at this stage form a dispersion, from which the nanowires 22 can be separated, washed, and dried. The nanowires 22 can be separated using centrifuge/vortex, but the separation is not limited to such a process. In one example, the dispersion is centrifuged at a speed of approximately 2000 revolutions per minute for five minutes, although it is to be understood that the speed and time can be varied.

The dried nanowires 22, whether metallic or ceramic, are relatively flexible because of the nanoscale cross-sectional size. Thus, even though metal and ceramic materials may form rigid structures when used in bulk amounts, the nanowires 22 are flexible and resilient at the nanoscale, yet are stiff enough to be self-supporting. The flexibility of the nanowires 22 enables the nanowires 22 to bend in response to stress that the nanowires 22 may be subjected to during fabrication. Moreover, in the loose arrangement 20, up until final bonding, localized movement of the nanowires 22 is not limited by permanent bonding to neighboring nanowires 22, which allows the nanowires 22 additional freedom to accommodate and mitigate any applied stresses.

In a further example, the nanowires 22 can be alloyed with one or more alloy elements. The dispersion of nanowires 22 described above can be combined with at least one solution that includes at least one alloy element. The alloy element can be an aqueous salt solution. In further examples, the alloy element can be selected from chromium, cobalt, molybdenum, tungsten, aluminum, rhenium, tantalum, hafnium, yttrium, carbon, boron, zirconium, and combinations thereof.

The combined mixture is then mixed with a reducing agent to reduce the at least one alloy element. Example reducing agents can include sodium borohydride, dimethylamine borane, or combinations thereof, but the reducing agent can be selected based upon the alloy metal to be reduced. In a further example, this reduction step can be conducted at approximately 120° C. with stirring for a predetermined amount of time which can range from one minute or less to several hours until the bubbles disappeared from the reaction solution. The carrier fluid is then removed, leaving nickel nanowires with the alloy element or elements. The nanowires are then washed and dried as described above. Upon thermal sintering, as described above, the alloy element or elements diffuses with the nickel to form nickel alloy nanowires that are bonded together to form the unitary nanocellular structure.

In such alloys, such as nickel alloys, cobalt can provide microstructural control, chromium can provide oxidation and corrosion resistance, tungsten, rhenium and tantalum can provide improved creep strength, hafnium and yttrium can provide improved oxidation resistance, and hafnium, carbon, boron, and zirconium can provide grain boundary ductility.

In further examples, the dispersion of the nanowires 22 in a carrier fluid can be cast into a geometry of an end-use article. As can be appreciated, forming of the nanowires 22 into a desired geometry is not limited to casting, and other processing techniques can alternatively be used.

Figure 4:
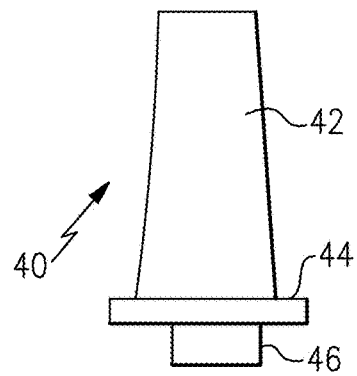
FIG. 4 schematically illustrates an example end-use article formed from the nanocellular material processes disclosed herein.

FIG. 4 schematically illustrates one example article 40, which in this instance is a gas turbine engine airfoil that includes an aerodynamic airfoil section 42, at least one platform section 44, and a root portion 46 for mounting the airfoil. The article 40 is formed, in whole or in part, of a unitary nanocellular structure fabricated by the methods disclosed herein. As can be appreciated, the geometry of the airfoil can be varied, depending upon the needs of a particular application. Furthermore, the article 40 is only one example, and the article 40 can alternatively be another gas turbine engine component, a non-engine component, any other component disclosed herein, or any component that would benefit from being fabricated, in whole or in part, of a unitary nanocellular structure.

The exemplary methods are readily scalable to allow fabrication of a variety of article sizes. For example, whereas supercritical drying and thermochemical reduction limit scale-up of comparison wet chemical processes, such as sol-gel, the methods herein avoid supercritical drying and thermochemical reduction to facilitate scalability.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of fabricating an article, the method comprising:
providing a dispersion of nickel nanowires in a first carrier fluid;
combining the dispersion with a solution including at least one alloy element in a second carrier fluid, wherein the at least one alloy element is selected from the group consisting of hafnium, yttrium, and combinations thereof;
removing the first carrier fluid and the second carrier fluid to provide an arrangement of dry, loose nanowires including the at least one alloy element;
diffusing the at least one alloying element into the nickel nanowires to form nickel alloy nanowires; and
bonding the dry, loose nanowires together into a unitary cellular structure.

2. The method as recited in claim 1, wherein the providing of the nickel nanowires includes forming the nickel nanowires by wet chemical synthesis without reduction of an oxide of the nickel of the nickel nanowires.

3. The method as recited in claim 1, including, before the bonding, consolidating the nickel nanowires under pressure to alter pore size and shape.

4. The method as recited in claim 1, including conducting the bonding in an environment having a gas that reacts with the nickel nanowires to alter the composition of the nickel nanowires.

5. The method as recited in claim 1, wherein the at least one alloy element is selected from the group consisting of rhenium, tantalum, hafnium, yttrium, zirconium, and combinations thereof.

6. The method as recited in claim 1, wherein the bonding includes thermal sintering.

7. The method as recited in claim 1, including, prior to the bonding, forming the dry, loose nanowires into a geometry of an end-use article.

8. The method as recited in claim 7, wherein the forming of the loose nanowires includes depositing successive layers of the nanowires.

9. The method as recited in claim 1, including forming the loose nanowires into a gas turbine engine airfoil by depositing the loose nanowires into a mold that has a geometry of the gas turbine engine airfoil followed by the bonding of the loose nanowires together into the unitary cellular structure that has the geometry of the gas turbine engine airfoil.

10. The method as recited in claim 1, wherein the dispersion of nickel nanowires in the first carrier fluid additionally includes elemental metal nanowires wherein the elemental metal is different than nickel.

11. The method as recited in claim 1, wherein the dispersion of nickel nanowires in the first carrier fluid additionally includes ceramic nanowires.

12. The method as recited in claim 1, wherein the dispersion of nickel nanowires in the first carrier fluid additionally includes ceramic nanowires.

13. The method as recited in claim 1, wherein the dispersion of nickel nanowires in the first carrier fluid additionally includes aluminide nanowires.

* * * * *